United States Patent Office 3,808,232
Patented Apr. 30, 1974

3,808,232
PROCESS OF PREPARING 4-HALOMETHYL COUMARINS AND COMPOUNDS
Peter Hardt, Peseux, and Karl-Josef Boosen, La Neuveville, Switzerland, assignors to Lonza Ltd., Basel, Switzerland
No Drawing. Filed July 28, 1972, Ser. No. 275,956
Claims priority, application Switzerland, Sept. 3, 1971, 12,937/71
Int. Cl. C07d 7/26
U.S. Cl. 260—343.2 R          16 Claims

ABSTRACT OF THE DISCLOSURE

A process for the preparation of 4-halomethyl-5-$R_1$ substituted-6-$R_2$ substituted-7-$R_3$ substituted-8-$R_4$ substituted-coumarin having the general formula:

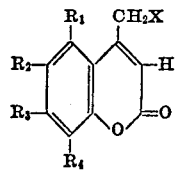

wherein X is chlorine or bromine, $R_1$ is —H or —$CH_3$, $R_2$ is —H, an alkyl group having 1 to 4 carbon atoms, —OH, —$OCH_3$ or a halogen atom, $R_3$ is —H, an alkyl group having 1 to 4 carbon atoms, —OH, —$OCH_3$ or a halogen atom, and $R_4$ is —H or —$CH_3$, or wherein when $R_1$ and $R_2$ are —H or —$CH_3$, $R_3$ and $R_4$ can form a benzo group, or wherein $R_1$ and $R_2$ can form a benzo group when $R_3$ and $R_4$ are —H or —$CH_3$, is disclosed. The process involves reacting diketene with halogen at temperatures between —30° and —10° C. in a solvent. The solvent is inert to halogen and is not miscible with sulfuric acid. γ-Haloacetoacetic halide is formed. The γ-haloacetoacetic halide is immediately converted using a phenol to a corresponding phenyl ester. The corresponding phenyl ester, without separating the solvent, is treated at a temperature between —30° to +30° C. with concentrated sulfuric acid. Two phases form. The lower sulfuric acid layer is separated and is hydrollized with an ice water admixture. 4-halomethyl-5-$R_1$ substituted-6-$R_2$ substituted-7-$R_3$ substituted-8-$R_4$ substituted coumarin precipitates. 4-halomethyl-5-$R_1$ substituted -6-$R_2$ substituted-7-$R_3$ substituted-8-$R_4$ substituted-coumarin is then isolated. Certain new substituted 4-halomethyl-coumarins are also disclosed.

BACKGROUND OF THIS INVENTION

(1) Field of this invention

This invention relates to a novel process of preparing certain 4-halomethyl-coumarins and also relates to certain novel 4-halomethyl-coumarins.

(2) Prior art

German application No. 1,929,839 (published) discloses producing 4-chloromethyl-7-hydroxycoumarin by reacting resorcin with γ-chloroacetoacetic ester in a 75 percent solution of sulfuric acid. A yield of 32.5 percent of 4-chloromethyl-7-hydroxycoumarin was obtained. J. Indian Chem. Soc., vol. II (1934), p. 687, discloses producing 4-bromomethyl-7-methylcoumarin by the conversion of γ-bromoacetoacetic ester and m-cresol in sulfuric acid at 0° C.

Belgian Pat. No. 633,476 and French Pat. No. 1,426,064 each describe the same process for the production of 4-halomethyl-6,7-dihydroxycoumarin, said process beginning with the reaction of 2-hydroxy-hydroquinone triacetate and γ-chloroacetoacetic ester in a 75 percent solution of sulfuric acid. For example, see Example 1 on p. 2 of French Pat. No. 1,426,064.

Chemical Abstracts, vol. 60 (1964), ref. 9236a, based on an article by M. S. Khaikin, N. L. Petrova and V. A. Kukhtin in Zh. Obshch. Khim., 33 (12), 3941–43 (1963), describes the synthesis of 4-chloromethyl-6,7-dihydroxycoumarin from 1,2-4-triacetoxy benzene and γ-chloroacetoacetic ester in a 75 percent solution of sulfuric acid.

However the known processes can be carried out only with individually substituted phenols. Also, the known processes, first of all, require that an alkyl ester of the acetoacetic acid halide must be formed separately in the first step of the process.

It is known that acetoacetic esters generally react with phenols to produce coumarin (Whitmore, Frank C., "Organic Chemistry," 2nd ed., D. Van Nostrand Co., Inc., New York (1951), p. 371).

BROAD DESCRIPTION OF THIS INVENTION

This invention involves a process for the preparation of 4-halomethyl-5-$R_1$ substituted-6-$R_2$ substituted-7-$R_3$ substituted-8-$R_4$ substituted-coumarin having the general formula:

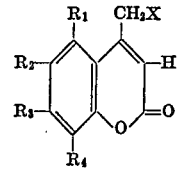

wherein X is chlorine or bromine, $R_1$ is —H, or —$CH_3$, $R_2$ is —H, an alkyl group having 1 to 4 carbon atoms, —OH, —$OCH_3$ or a halogen atom, $R_3$ is —H, an alkyl group having 1 to 4 carbon atoms, —OH, —$OCH_3$ or a halogen atom, and $R_4$ is —H or —$CH_3$, or wherein when $R_1$ and $R_2$ are —H or —$CH_3$, $R_3$ and $R_4$ can form a benzo group, or wherein $R_1$ and $R_2$ can form a benzo group when $R_3$ and $R_4$ are —H or —$CH_3$. The process includes reacting diketene with halogen at temperatures between —30° and —10° C. in a solvent. The solvent is inert to halogen and is not miscible with sulfuric acid. Acetoacetic halide is formed. The acetoacetic halide is immediately converted using a phenol to a corresponding phenyl ester. The corresponding phenyl ester, without separating the solvent is treated at a temperature between —30° and +30° C. with concentrated sulfuric acid. Two phases form. The lower sulfuric acid layer is separated and hydrolized with an ice water admixture. 4-halomethyl-5-$R_1$ substituted-6-$R_2$ substituted-7-$R_3$ substituted-8-$R_4$ substituted-coumarin precipitates. The precipitated 4-halomethyl-5-$R_1$ substituted-6-$R_2$ substituted-7-$R_3$ substituted-8-$R_4$ substituted coumarin is then isolated.

This invention also includes the following novel compounds: 4-chloromethylcoumarin, 4-chloromethyl-5,7-8-trimethyl-coumarin, 4 - bromomethyl - 5,7 - dimethyl-coumarin, 7,8 - benzo-4-chloromethyl-coumarin, 4-chloromethyl-7-methoxy-coumarin and 6-tert.-butyl-4-chloromethyl-coumarin.

The products produced by the process of this invention are useful in the pharamaceutical industry or as intermediates in the production of products useful in the pharmaceutical industry. The products produced by the process of this invention are also useful as fixative and enhancing agents for the odor of the essential oils in the perfume industry. One advantage of the process of this invention is that the products produced thereby are usually produced in high yields, and apparently in all cases in higher yields than by known processes. Comparative experiments, set forth below, show that unsatisfactory results and yields are obtained in the production of substituted coumarins in many instances using known processes.

Other advantages of the process of this invention are that the main reaction portion of the process involves what is essentially one contiguous process step and that the starting materials of the process are easily accessible starting materials.

DETAILED DESCRIPTION OF THIS INVENTION

The solvent used in this process can be any suitable material, such as, carbon tetrachloride (preferred), trichlorofluoromethane, 1,1 - dichloro - 1,2,2,2 - tetrafluoro-ethane, 1,2-dichloro-1,1,2,2-tetrafluoro-ethane, and 1,1,2-trichloro-1,2,2-trifluoro-ethane. The solvent must be inert to halogen and must not be miscible with sulfuric acid. If the solvent planned to be used has halogen atoms used as a reactant in the process of this invention, that solvent should not be used.

The reaction involving the phenol is normally conducted at a temperature between $-30°$ and $30°$ C., and preferably at about $-5°$ C. A low temperature can be followed by a higher temperature phase, e.g., $-5°$ C. followed by $20°$ C.

X, as used herein, can be a halogen atom, (preferred) chlorine or bromine.

$R_1$ and $R_2$ as used herein, can be an alkyl group having one to four carbon atoms. Examples of such alkyl groups are methyl, ethyl, n-propyl, isopropyl, n-butyl, isobutyl and tert.-butyl. $R_1$ and $R_2$, as used herein, can be a chlorine atom (preferred), a bromine atom (preferred), a fluorine atom and an iodine atom.

As used in this application, the term phenol includes:

phenol;
o-cresol;
m-cresol;
p-cresol;
3-bromo-o-cresol;
3,4-dibromo-o-cresol;
3-fluoro-o-cresol;
3,4-dichloro-o-cresol;
3-chloro-o-cresol;
3,4-dihydroxy-o-cresol;
3-iodo-o-cresol;
3-methoxy-o-cresol;
3,4-dimethoxy-o-cresol;
3-hydroxy-o-cresol;
3,4-diethyl-o-cresol;
3-ethyl-o-cresol;
3,4-disobutyl-o-cresol;
3-n-propyl-o-cresol;
3-isopropyl-o-cresol;
3-n-butyl-o-cresol;
3-isobutyl-o-cresol;
3-tert.-butyl-o-cresol;
3-bromo-4-chloro-o-cresol;
3-chloro-4-bromo-o-cresol;
3-hydroxy-4-ethyl-o-cresol;
3-hydroxy-4-methoxy-o-cresol;
3-hydroxy-4-bromo-o-cresol;
3-hydroxy-4-chloro-o-cresol;
3-methoxy-4-ethyl-o-cresol;
3-methoxy-4-hydroxy-o-cresol;
3-methoxy-4-bromo-o-cresol;
3-methoxy-4-chloro-o-cresol;
3-chloro-4-hydroxy-o-cresol;
3-chloro-4-ethyl-o-cresol;
3-chloro-4-methoxy-o-cresol;
3-ethyl-4-hydroxy-o-cresol;
3-ethyl-4-methoxy-o-cresol; and
3-ethyl-4-bromo-o-cresol.

The term phenol also includes:

3-ethyl-4-n-propyl-o-cresol;
3-ethyl-4-isobutyl-o-cresol;
3-ethyl-4-tert.-butyl-o-cresol;
3-ethyl-4-isopropyl-o-cresol;
3-ethyl-4-n-butyl-o-cresol;
3-n-propyl-4-ethyl-o-cresol;
3-isopropyl-4-ethyl-o-cresol;
3-tert.-butyl-4-ethyl-o-cresol;
3-n-butyl-4-ethyl-o-cresol;
3-isobutyl-4-ethyl-o-cresol;
3-n-propyl-4-isopropyl-o-cresol;
3-n-butyl-4-isopropyl-o-cresol;
4-bromo-m-cresol;
3-bromo-p-cresol;
4-chloro-m-cresol;
3-chloro-p-cresol;
4-ethyl-m-cresol;
3-ethyl-p-cresol;
4-methoxy-m-cresol;
3-methoxy-p-cresol;
4-hydroxy-m-cresol;
3-hydroxy-p-cresol;
4-n-butyl-m-cresol;
3-isobutyl-p-cresol;
4-isobutyl-m-cresol;
3-n-propyl-p-cresol;
2,3-dimethyl-phenol;
3,4-dihydroxy-phenol;
2,4-dimethyl-phenol;
3,4-dimethyl-phenol;
2,5-dimethyl-phenol;
3,4-dimethyl-phenol;
3,5-dimethyl-phenol;
3,4-diethyl-phenol;
3,4-di-n-butyl-phenol;
3,4-di-n-propyl-phenol; and
3,4-disopropyl-phenol.

The term phenol further includes:

3-ethyl-4-bromo-phenol;
2,3,5-trimethyl-phenol;
3-ethyl-4-chloro-phenol;
2,4,5-trimethyl-phenol;
3-ethyl-4-methoxy-phenol;
2,3,4-trimethyl-phenol;
3-ethyl-4-hydroxy-phenol;
3,4,5-trimethyl-phenol;
3-ethyl-4-n-butyl phenol;
2,3,4,5-tetramethyl-phenol;
3-ethyl-4-isopropyl-phenol;
3-bromo-4-hydroxy-phenol;
3-bromo-4-n-butyl-phenol;
3-chloro-4-hydroxy-phenol;
3-chloro-4-ethyl-phenol;
3-hydroxy-4-methoxy-phenol;
3-hydroxy-4-bromo-phenol;
3-hydroxy-4-chloro-phenol;
3-hydroxy-4-ethyl-phenol;
3-hydroxy-4-n-butyl-phenol;
3-methoxy-4-hydroxy-phenol;
3-methoxy-4-bromo-phenol;
3-methoxy-4-chloro-phenol;
3-methoxy-4-isopropyl-phenol;
3-n-butyl-4-isopropyl-phenol;
3-n-butyl-4-ethyl-phenol;
3-isopropyl-4-ethyl-phenol;
3-tert.-butyl-4-isopropyl-phenol;
3-n-propyl-4-n-butyl-phenol;
3-isobutyl-4-tert.-butyl-phenol;
2,3-dimethyl-4-bromo-phenol;
2,3-dimethyl-4-chloro-phenol;
2,3-dimethyl-4-methoxy-phenol;
2,3-dimethyl-4-hydroxy-phenol;
2,3-dimethyl-4-ethyl-phenol;
2,4-dimethyl-3-methoxy-phenol;
2,4-dimethyl-3-chloro-phenol;
2,4-dimethyl-3-hydroxy-phenol;

2,4-dimethyl-3-bromo-phenol;
2,4-dimethyl-3-n-butyl-phenol;
2,5-dimethyl-3-chloro-phenol;
2,5-dimethyl-3-bromo-phenol;
2,5-dimethyl-3-methoxy-phenol;
2,5-dimethyl-3-hydroxy-phenol;
2,5-dimethyl-3-isopropyl-phenol;
2,5-dimethyl-4-chloro-phenol;
2,5-dimethyl-4-bromo-phenol;
2,5-dimethyl-4-hydroxy-phenol;
2,5-dimethyl-4-methoxy-phenol;
2,5-dimethyl-4-ethyl-phenol;
2,5-dimethyl-3-bromo-4-chloro-phenol;
2,5-dimethyl-3-bromo-4-hydroxy-phenol;
2,5-dimethyl-3-bromo-4-methoxy-phenol;
2,5-dimethyl-3-bromo-4-ethyl-phenol;
2,5-dimethyl-3-chloro-4-bromo-phenol;
2,5-dimethyl-3-chloro-4-methoxy-phenol;
2,5-dimethyl-3-chloro-4-hydroxy-phenol;
2,5-dimethyl-3-chloro-4-n-propyl-phenol;
2,5-dimethyl-3-hydroxy-4-chloro-phenol;
2,5-dimethyl-3-hydroxy-4-methoxy-phenol;
2,5-dimethyl-3-hydroxy-4-ethyl-phenol; and
2,5-dimethyl-3-hydroxy-4-methoxy-phenol.

The term phenol still further includes:

2,5-dimethyl-3,4-dibromo-phenol;
2,5-dimethyl-3,4-dichloro-phenol;
2,5-dimethyl-3,4-dihydroxy-phenol;
2,5-dimethyl-3,4-dimethoxy-phenol;
2,5-dimethyl-3,4-diethyl-phenol;
2,5-dimethyl-3,4-diisobutyl-phenol;
2,5-dimethyl-3-methoxy-4-chloro-phenol;
2,5-dimethyl-3-methoxy-4-bromo-phenol;
2,5-dimethyl-3-methoxy-4-hydroxy-phenol;
2,5-dimethyl-3-methoxy-4-ethyl-phenol;
2,5-dimethyl-3-ethyl-4-bromo-phenol;
2,5-dimethyl-3-ethyl-4-chloro-phenol;
2,5-dimethyl-3-ethyl-4-n-propyl-phenol;
2,5-dimethyl-3-ethyl-4-tert.-butyl-phenol;
2,5-dimethyl-3-ethyl-4-methoxy-phenol;
2,5-dimethyl-3-ethyl-4-hydroxy-phenol;
2,5-dimethyl-3-n-propyl-4-isopropyl-phenol;
3,5-dimethyl-4-bromo-phenol;
3,5-dimethyl-4-chloro-phenol;
3,5-dimethyl-4-methoxy-phenol;
3,5-dimethyl-4-hydroxy-phenol;
3,5-dimethyl-4-ethyl-phenol;
3,5-dimethyl-4-isobutyl-phenol;
2,3,5-trimethyl-4-bromo-phenol;
2,3,5-trimethyl-4-chloro-phenol;
2,3,5-trimethyl-4-methoxy-phenol;
2,3,5-trimethyl-4-hydroxy-phenol;
2,3,5-trimethyl-4-ethyl-phenol;
2,4,5-trimethyl-3-bromo-phenol;
2,4,5-trimethyl-3-hydroxy-phenol;
2,4,5-trimethyl-3-methoxy-phenol;
2,4,5-trimethyl-n-propyl-phenol; and
2,3,5-trimethyl-3-chloro-phenol.

The term phenol, as used in this application, includes: β-naphthol (or 2-naphthol); 3-methyl-β-naphthol; 4-methyl-β-naphthol; 3,4-dimethyl-β-naphthol; α-naphthol; 3-methyl-α-naphthol; 4-methyl α-naphthol; and 3,4-di-methyl-α-naphthol.

As used herein concentrated sulfuric acid contains at least 75 percent by weight of sulfuric acid, and preferably contains at least 93 percent by weight of sulfuric acid.

The preferred temperature range for the concentrated sulfuric acid treatment of the phenyl ester admixture is between —25° and 0° C. After the two resulting layers have formed, the lower sulfuric acid layer can be separated by any convenient method. Also the precipitated substituted 4-halomethyl-coumarin can be separated by any convenient method.

The products produced by the process of this invention can be recrystallized using any suitable material, such as, methanol, chloroform, methylethyl ketone, a mixture of chloroform and ligroin, glacial acetic acid, isopropanol, and a mixture of methanol and chloroform.

In the following examples, and throughout the rest of this application, all percentages, parts and proportions are expressed on a weight basis unless otherwise expressed or it is obvious that another basis was used.

EXAMPLE 1

The following example demonstrates a prior art process for the production of 4-chloromethyl-coumarin. Using a process which was analogous to the process for the production of 4 - bromomethyl - 7 - methyl-coumarin in J. Indian Chem. Soc., vol 11, p. 688 (1934), 80 ml. of concentrated sulfuric acid were mixed at 0° C. with a solution of 10.5 gm. of phenol in 18.9 gm. of γ-chloroacetoacetic ester. The dark suspension obtained after hydrolysis of the sulfuric acid solution with 900 gm. of an ice-water admixture was completely extracted with chloroform. 18.3 gm. of a light brown oil were obtained as a residue of the chloroform solution. No 4-chloromethyl-coumarin could be found in the light brown oil by means of thin-layer chromatography.

EXAMPLE 2

The following example domonstrates a prior art process for the production of 4-chloromethyl-8-methyl-coumarin. Using a process which was analogous to the process in German application No. 1,929,839 (published) for the production of 4-chloromethyl-7-hydroxy-coumarin, a dark brown poorly-filterable suspension was obtained after reaction and hydrolysis of an admixture of 20.2 gm. of o-cresol, 32.8 gm. of γ-chloroacetoacetic ester and 200 ml. of a 75 percent solution of $H_2SO_4$. This mixture could be extracted using chloroform only with difficulty. 8.5 gm. of a brown highly-viscous mass were obtained as an extraction residue wherein besides at least seven other components, only traces of 4-chloromethyl-8-methyl-coumarin was found by means of thin-layer chromatography.

EXAMPLE 3

In a 1-liter reaction flask provided with an agitating mechanism, thermometer, gas input tube, drip funnel and drying tube, 42 gm. of diketene in 250 ml. of carbon tetrachloride were reacted, in succession at —20° C. with 35.5 gm. of chlorine and at —5° C. with 54.1 gm. of m-cresol. The reaction solution was then diluted with 100 ml. of carbon tetrachloride. The reaction solution was carefully reacted subsequently at —25° C. with 200 ml. of concentrated $H_2SO_4$ (97 percent), and was heated to room temperature. The admixture was transferred to a separating funnel. The two phases formed and were separated. The lower layer of sulfuric acid, that has a color ranging from an intensive orange to a brown, was hydrolyzed by dripping it into 2 kg. of an ice-water admixture. The resultant precipitate was collected on a suction filter, washed with water until it was free of acid and dried in a vacuum cabinet at 60° C. 76.4 gm. of 4-chloromethyl-7-methyl-coumarin, which corresponds to a yield of 72.3 percent, based on the amount of the starting m-cresol. The product has a purity of 98.7 percent. After recrystallization from glacial acetic acid the product was found to have a melting point of 222° C. An analysis of the product ($C_{11}H_9ClO_2$) was:

Calculated (percent): C, 63.32; H, 4.35. Found (percent): C, 63.3; H, 4.39.

EXAMPLE 4

Using a process analogous to that of Example 3, 0.6 mole of γ-chloroacetoacetic acid chloride was produced in 400 ml. carbon tetrachloride, and was then reacted at −5° C. by batches over a period of 1 to 2 hours with 55 gm. of finely ground resorcinol (m-dihydroxybenzene). (If necessary, the mixture subsequently can be stirred at 20° C. until a yellow emulsion develops.) The emulsion was cooled to −10° C. and reacted with 200 ml. of concentrated $H_2SO_4$. The experiment continued as set forth in Example 3. 86.7 gm. of 4-chloromethyl-7-hydroxy-coumarin raw product were obtained which corresponded to a yield of 74.3 percent, based on the amount of the starting resorcin. The product had a purity of 90.3 percent. After recrystallization from isopropanol the product was found to have a melting point of 184° C. An analysis of the product ($C_{10}H_7ClO_3$) was:

Calculated (percent): C, 57.03; H, 3.35. Found (percent): C, 57.1; H, 3.40.

EXAMPLE 5

An admixture of 80 gm. of bromine in 100 ml. of carbon tetrachloride were added to an admixture of 42 gm. of diketene in 200 ml. of carbon tetrachloride at −10° C. Then an admixture of 54.1 gm. of m-cresol in 100 ml. carbon tetrachloride were added at −5° C. Following the procedure of Example 3, 200 ml. of concentrated $H_2SO_4$ were added. The two layers were separated as in Example 3. The lower layer was hydrolyzed. The precipitate was separated and washed as in Example 3. The precipitate was dried at 30° C. in a vacuum weight cabinet to a constant weight. 100.4 gm. of 4-bromomethyl-7-methyl-coumarin were obtained, which corresponded to a yield of 78.1 percent based on the amount of the starting m-cresol. The product had a purity of 98.5 percent. After recrystallization from methylethyl ketone, the product was found to have a melting point of 237° C. An analysis of the product ($C_{11}H_9BrO_2$) was:

Calculated (percent): C, 52.20; H, 3.58. Found (percent): C, 52.6; H, 3.61.

EXAMPLE 6

Following the procedure of Example 5, 100.7 gm. of 4-bromomethyl-5,7-dimethyl-coumarin, corresponding to a yield of 74.6 percent based on the amount of the starting 3,5-dimethylphenol, and having a purity of 98.8% were obtained. The reactants and substances used in the procedure were 42 gm. of diketene, 80 gm. of bromine, 61.1 gm. of 3,5-dimethylphenol, 400 ml. of carbon tetrachloride and 200 ml. of concentrated $H_2SO_4$. After recrystallization from an admixture of methanol and chloroform, the product had a melting point of 156° C. An analysis of the product ($C_{12}H_{11}BrO_2$) was:

Calculated (percent): C, 53.96; H, 4.15. Found (percen): C, 53.9; H, 4.09.

EXAMPLE 7

Following the procedure of Example 4, 42 gm. of diketene in 400 ml. carbon tetrachloride were successively reacted with 35.5 gm. of chlorine and 72.1 gm. of α-naphthol. (The Example 4 temperatures were used. The reaction mixture was treated with 400 ml. of concentrated $H_2SO_4$ at −25° C. Subsequently this admixture was heated to room temperature and the separated acid suspension was hydrolyzed. The rest of the example followed the procedure of Example 4. 100.6 gm. of a 7,8-benzo-4-chloromethylcoumarin were obtained, which corresponded to a yield of 78.5 percent based on the amount of the starting α-naphthol. The product has a purity of 95.5 percent. After recrystallization from an admixture of methanol and chloroform, the product had a melting point of 179° C. An analysis of the product ($C_{12}H_9ClO_2$) was:

Calculated (percent): C, 68.72; H, 3.71. Found (percent): C, 68.6; H, 3.67.

EXAMPLE 8

Example 3 was repeated except that the m-cresol was replaced with phenol. The product was 4-chloromethyl-coumarin, which had a purity of 99.6 percent. The product yield was 9.7 percent based on the amount of the starting phenol. The product was then recrystallized with methanol. The product had a melting point of 145° C. The C and H found by analysis of the product corresponded to the theoretical values for 4-chloromethyl-coumarin.

EXAMPLE 9

Example 3 was repeated except that the m-cresol was replaced with o-cresol. The product was 4-chloromethyl-8-methyl-coumarin, which had a purity of 99.2 percent. The product yield was 41.7 percent based on the amount of the starting o-cresol. The product was then recrystallized with methylethyl ketone. The product had a melting point of 150° C. The C and H found by analysis of the product corresponded to the theoretical values for 4-chloromethyl-8-methyl-coumarin.

EXAMPLE 10

Example 3 was repeated except that the m-cresol was replaced with 3-methoxyphenol. The product was 4-chloromethyl-7-methoxy-coumarin, which had a purity of 97.2 percent. The product yield was 42.1 percent based on the amount of the starting 3-methoxyphenol. The product was then recrystallized with methylethyl ketone. The product had a melting point of 203° C. The C and H found by analysis of the product corresponded to the theoretical values for 4-chloromethyl-7-methoxy-coumarin.

EXAMPLE 11

Example 3 was repeated except that the m-cresol was replaced with isothymol. The product was 4-chloromethyl-7-isopropyl-5-methyl-coumarin, which had a purity of 95.8 percent. The product yield was 75.2 percent based on the amount of the starting isothymol. The product was then recrystallized with methanol. The product had a melting point of 134° C. The C and H found by analysis of the product corresponded to the theoretical values for 4-chloromethyl-7-isopropyl-5-methyl-coumarin.

EXAMPLE 12

Example 3 was repeated except that the m-cresol was replaced with 2,3-dimethyl-phenol. The product was 4-chloromethyl-7,8-dimethyl-coumarin, which had a purity of 98.3 percent. The product yield was 92.4 percent based on the amount of the starting 2,3-dimethyl-phenol. The product was then recrystallized with chloroform. The product had a melting point of 176° C. The C and H found by analysis of the product corresponded to the theoretical values for 4-chloromethyl-7,8-dimethyl-coumarin.

EXAMPLE 13

Example 3 was repeated except that the m-cresol was replaced with 3,5-dimethyl-phenol. The product was 4-chloromethyl-5,7-dimethyl coumarin, which had a purity of 98.5 percent. The product yield was 93.2 percent based on the amount of the starting 3,5-dimethyl-phenol. The product was then recrystallized with chloroform. The product had a melting point of 180.5 C. The C and H found by analysis of the product corresponded to the theoretical values for 4 - chloromethyl-5,7-dimethyl-coumarin.

EXAMPLE 14

Example 3 was repeated except that the m-cresol was replaced with 2,3,5-trimethyl phenol. The product was 4-chloromethyl-5,7,8-trimethyl-coumarin, which had a purity of 98.2 percent. The product yield was 94.0 percent based on the amount of the starting 2,3,5-trimethyl-phenol. The product was then recrystallized with a mixture of chloroform and ligroin. The product had a melting point of 145.5° C. The C and H found by analysis of the product corresponded to the theoretical value for 4-chloromethyl-5,7,8-trimethyl-coumarin.

EXAMPLE 15

Example 3 was repeated except that the m-cresol was replaced with p-cresol. The product was 4-chloromethyl-6-methyl-coumarin, which had a purity of 99.0 percent. The product yield was 63 percent based on the amount of the starting p-cresol. The product was then recrystallized with chloroform. The product had a melting point of 149° C. The C and H found by analysis of the product corresponded to the theoretical values for 4-chloromethyl-6 methyl-coumarin.

EXAMPLE 16

Example 3 was repeated except that the m-cresol was replaced with 4-chloro-m-cresol. The product was 4-chloromethyl-6-chloro-7-methyl-coumarin, which had a purity of 96.8 percent. The product yield was 23.9 percent based on the amount of the starting 4-chloro-m-cresol. The product was then recrystallized with chloroform. The product had a melting point of 221° C. The C and H found by analysis of the product corresponded to the theoretical values for 4-chloromethyl-6-chloro-7-methyl-coumarin.

EXAMPLE 17

Example 3 was repeated except that the m-cresol was replaced with 4-tert.-butyl-phenol. The product was 4-chloromethyl-6-tert.-butyl-coumarin, which had a purity of 99.0 percent. The product yield was 35.8 percent based on the amount of the starting 4-tert.-butyl-phenol. The product was then recrystallized with methylethyl ketone. The product had a melting point of 140° C. The C and H found by analysis of the product corresponded to the theoretical values for 4-chloromethyl-6-tert.-butyl-coumarin.

EXAMPLE 18

Example 3 was repeated except that the m-cresol was replaced with β-naphthol. The product was 4-chloromethyl-5,6-benzo-coumarin, which had a purity of 98.5 percent. The product yield was 82.4 percent based on the amount of the starting β-naphthol. The product was then recrystallized with methylethyl ketone. The product has a melting point of 185° C. The C and H found by analysis of the product corresponded to the theoretical values for 4-chloromethyl-5,6-benzo-coumarin.

What is claimed is:
1. 4-chloromethyl-coumarin.
2. 4-chloromethyl-5,7,8-trimethyl-coumarin.
3. 4-bromomethyl-5,7-dimethyl-coumarin.
4. 4-chloromethyl-7,8-benzo-coumarin.
5. 4-chloromethyl-7-methoxy-coumarin.
6. 6-tert.-butyl-4-chloromethyl-coumarin.
7. A process for the preparation of 4-halomethyl-5-$R_1$ substituted-6-$R_2$ substituted-7-$R_3$ substituted-8-$R_4$ substituted-coumarin having the formula:

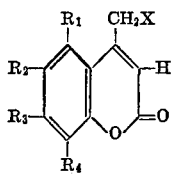

wherein X is halogen, $R_1$ is —H or —$CH_3$, $R_2$ is —H, an alkyl group having 1 to 4 carbon atoms, —OH, —$OCH_3$ or a halogen atom, $R_3$ is —H, an alkyl group having 1 to 4 carbon atoms, —OH, —$OCH_3$ or a halogen atom, and $R_4$ is —H or —$CH_3$, or wherein $R_3$ and $R_4$ can form a benzo group when $R_1$ is —H or —$CH_3$ and $R_2$ is —H or —$CH_3$, or wherein $R_1$ and $R_2$ can form a benzo group when $R_3$ is —H or —$CH_3$ and $R_4$ are —H or —$CH_3$, which comprises reacting diketene with halogen at temperatures between —30° and —10° C. in a solvent, said solvent being inert to halogen and not miscible with sulfuric acid, γ-haloacetoacetic halide forming, immediately converting said γ-haloacetoacetic halide with a phenol having the formula:

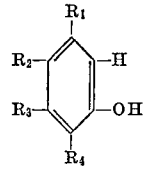

wherein $R_1$ is —H or —$CH_3$, $R_2$ is —H, an alkyl group having 1 to 4 carbon atoms, —OH, —$OCH_3$ or a halogen atom, $R_3$ is —H, an alkyl group having 1 to 4 carbon atoms, —OH, —$OCH_3$ or a halogen atom, and $R_4$ is —H or —$CH_3$, or wherein $R_3$ and $R_4$ can form a benzo group when $R_1$ is —H or —$CH_3$ and $R_2$ is —H or —$CH_3$, or wherein $R_1$ and $R_2$ can form a benzo group when $R_3$ is —H or —$CH_3$ and $R_4$ are —H or —$CH_3$, to the corresponding phenyl ester, treating said corresponding phenyl ester, without separation from said solvent, at a temperature between —30° and +30° C. with concentrated sulfuric acid, two phases forming, separating the lower sulfuric acid layer, hydrolyzing the lower sulfuric acid layer with an ice-water admixture, 4-halomethyl-5-$R_1$ substituted - 6-$R_2$ substituted-7-$R_3$ substituted-8-$R_4$ substituted-coumarin precipitating, and isolating said precipitated 4-halomethyl - 5-$R_1$ substituted-6-$R_2$ substituted-7-$R_3$ substituted-8-$R_4$ substituted-coumarin.

8. A process as described in claim 7 wherein X is chlorine or bromine.
9. A process as described in claim 8 wherein said halogen which is reacted with said diketene is bromine or chlorine.
10. A process as described in claim 2 wherein said halogen is chlorine.
11. A process as described in claim 8 wherein said phenol is β-naphthol, 2,3,5-trimethyl-phenol, p-cresol, m-cresol, resorcinol, 3,5-dimethyl-phenol or α-naphthol.
12. A process as described in claim 8 wherein $R_2$ is bromine or chlorine.
13. A process as described in claim 8 wherein $R_3$ is bromine or chlorine.
14. A process as described in claim 8 wherein said solvent is carbon tetrachloride.
15. A process as described in claim 8 wherein the treatment of said corresponding phenyl ester with said concentrated sulfuric acid is conducted at a temperature between —25° and 0° C.
16. A process as described in claim 8 wherein said 4-halomethyl-5-$R_1$ substituted-6-$R_2$ substituted-7-$R_3$ substituted-8-$R_4$ substituted-coumarin is recrystallized.

References Cited

FOREIGN PATENTS

1,426,064  12/1965  France.
633,476   10/1963  Belgium.

OTHER REFERENCES

Chemical Abstracts, vol. 60, ref. 9235h (1964).

JOHN M. FORD, Primary Examiner

U.S. Cl. X.R.

252—522